Figure 1:
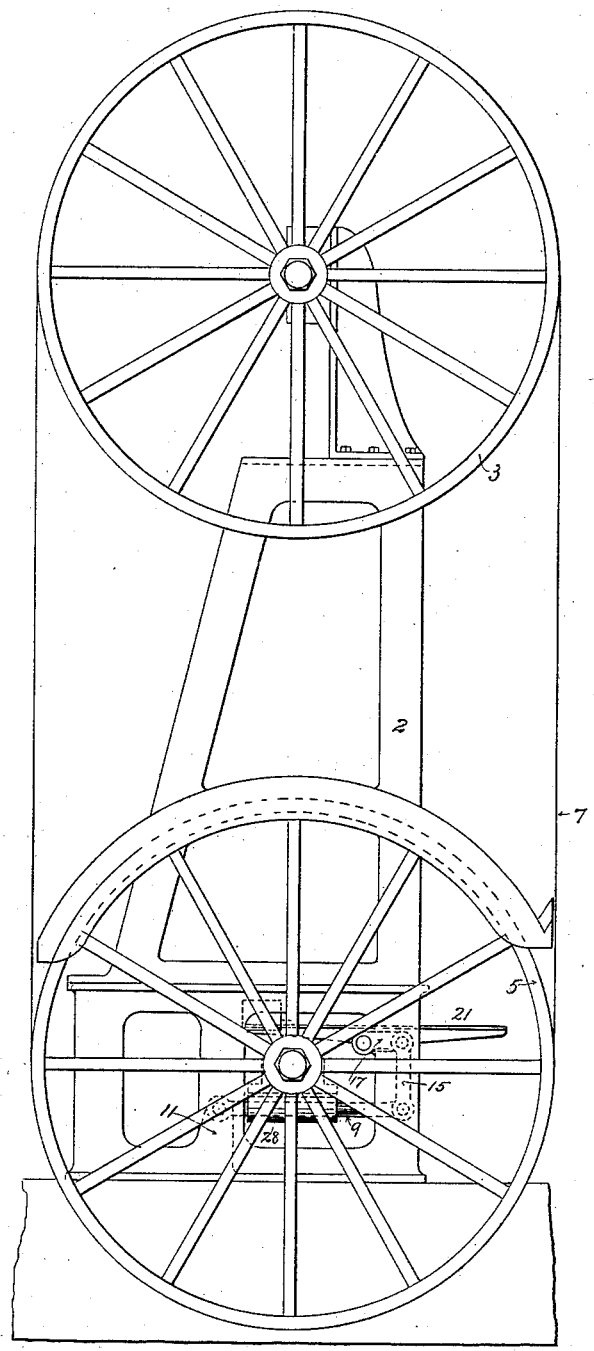

(No Model.)

2 Sheets—Sheet 1.

C. ESPLIN.
BAND SAW MILL.

No. 340,943. Patented Apr. 27, 1886.

Witnesses
Chas L. James
R. H. Sanford

Inventor
Charles Esplin,
By A. C. Paul,
Atty.

(No Model.) 2 Sheets—Sheet 2.

C. ESPLIN.
BAND SAW MILL.

No. 340,943. Patented Apr. 27, 1886.

Witnesses
Chas L. James
R. H. Sanford

Inventor
Charles Esplin
By A. C. Paul
Atty

UNITED STATES PATENT OFFICE.

CHARLES ESPLIN, OF MINNEAPOLIS, MINNESOTA, ASSIGNOR OF ONE HALF TO THE PRAY MANUFACTURING COMPANY, OF SAME PLACE.

BAND-SAW MILL.

SPECIFICATION forming part of Letters Patent No. 340,943, dated April 27, 1886.

Application filed January 22, 1886. Serial No. 189,359. (No model.)

*To all whom it may concern:*

Be it known that I, CHARLES ESPLIN, of Minneapolis, in the county of Hennepin and State of Minnesota, have invented certain Improvements in Self-Adjusting Lower Wheels for Regulating the Tension of Band-Saws, of which the following is a specification.

My invention relates to means for regulating the tension of band-saws.

As band sawing-machines are usually constructed, power is applied to the lower wheel, and the top wheel is a supporting-wheel that runs loosely and carries the upper part of the saw. This wheel must be made of sufficient strength to support the saw under the great strain to which it is subjected. The top wheel is therefore so heavy that it acts as a powerful fly-wheel. As the saw enters the cut, it is stretched, and the additional strain causes it to wrap around the wheels more closely on the tight side, thereby causing some slack, which the momentum or overthrow of the heavy top wheel carries over to the cutting part of the saw. The saw is therefore slack or crooked as it enters the cut, and this produces crooked or wavy lumber. Heretofore the top wheel has been mounted in sliding boxes and provided with springs or weights to move it vertically to take up the slack in the saw. I find, however, that this arrangement is inadequate for the purpose, for the reason that the weight of the top wheel, its shaft, boxes, and regulating devices must be overcome by the operating means before the wheel can be moved to take up the slack. These parts form a mass of considerable weight, which it takes some time to get in motion. The downward pull of the saw on the top wheel must also be overcome before the tightening device can operate, and in order to be effective the motion of the wheel must be instantaneous—a result unattainable under the common methods of construction. The momentum of the top wheel throws the slack of the saw to the cutting portion, and unless the regulating device acts instantaneously when the slack occurs the slack part of the saw will enter the cut, and the lumber will be wavy and crooked. I obviate these objections by providing means for regulating the tension that acts instantaneously and directly on the part of the saw in which the slack occurs; and my invention consists, generally, in a band-sawing machine having its lower wheel mounted in yielding bearings and forming an automatic tightener for the saw.

My invention also consists in the construction and combination hereinafter described, and particularly pointed out in the claims.

Figure 2:
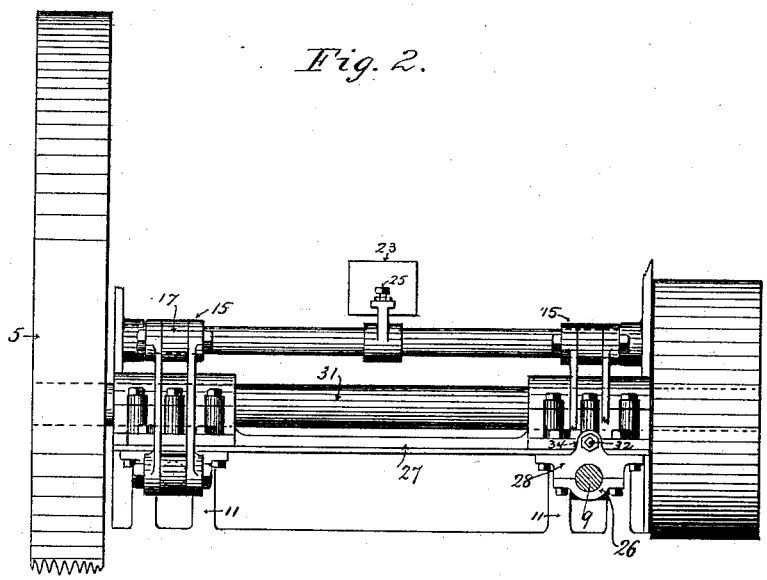
Figure 3:
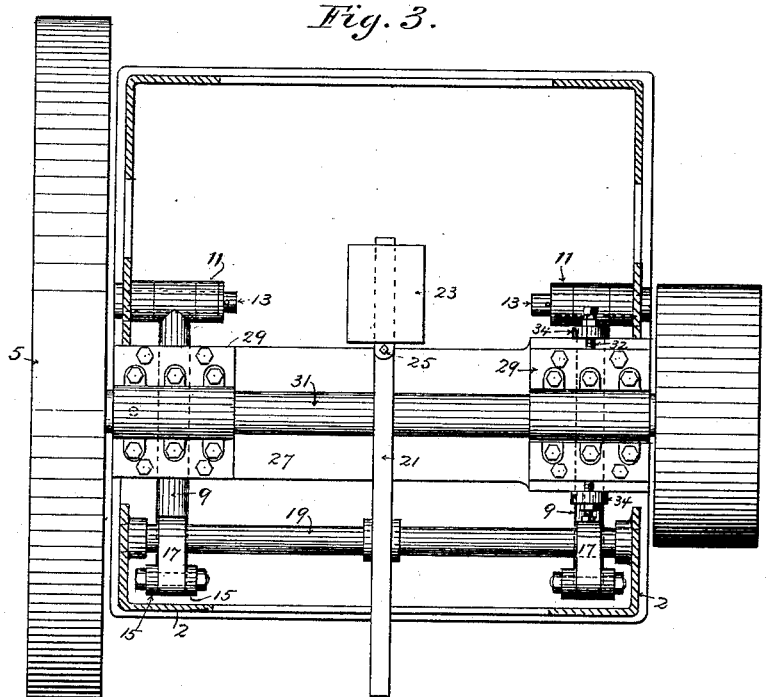

In the accompanying drawings, forming part of this specification, Figure 1 is a front elevation of a band sawing-machine embodying my invention. Fig. 2 is a sectional side elevation of the lower part of the machine. Fig. 3 is a sectional plan view of the same.

In the drawings, 2 represents the frame of the machine, which may be of any suitable construction. Upon the upper part of this frame is journaled the upper wheel, 3, and in the lower part the lower or driving wheel, 5. The band-saw 7 passes around and is supported upon these wheels in the usual manner.

The construction I have shown for supporting the lower wheel is as follows: Projecting from the bed-plate of the frame, near each side thereof, are the lugs or bearings 11 11. Between these lugs are pivoted, by bolts 13, the bearing-bars 9. The opposite ends of these bars are connected by links 15 15 with arms 17, upon a shaft, 19, that is journaled in bearings upon the sides of the frame. A bar, 21, is secured transversely on the top of the shaft 19, and upon this is a sliding weight, 23, provided with a set-screw, 25, by which it may be secured in any desired position on the bar 21. To the bearing-bars 9 a plate, 27, is secured by pillow-blocks 28, having caps 26, (see Fig. 2,) and the boxes 29 are cast in one piece with this plate or they might be formed separately and rigidly secured thereto.

The shaft 31 of the lower wheel, 5, is mounted in the boxes 29. This shaft is provided with a pulley, 33, to which power is applied to drive the machine. The weight 23 counterbalances the weight of the shaft, boxes, band-wheel, and driving-pulley, and its position on the bar 21 determines the amount of tension that will be brought on the saw, which will be a positive tension, and will instantaneously act to take up the stretch of the saw as it enters the cut. This movable lower wheel acts instantaneously and directly upon the part of the saw in which the slack occurs, and keeps the saw straight in the material, so that it makes a straight cut.

I do not confine myself to the construction shown for supporting the lower wheel, as the same may be varied without departing from my invention; and I believe myself to be the first to provide a band sawing-machine with a lower wheel that instantaneously regulates the tension of the saw.

Under the end of the shaft nearest the wheel 5 the plate 27 is pivoted to the pillow-block 28. The end of the shaft farthest from the wheel is adjustable, both vertically and horizontally, so that the band-wheel can be tipped or trained to run in any required line. The horizontal adjustment is secured by means of set-screws 32, which are tapped through lugs 34 on the pillow-blocks 28. The ends of the screws bear against the opposite sides of the box 29. The vertical adjustment is secured by loosening the bolts that hold the plate 27 to the pillow-block, and inserting packing-pieces or a taper wedge-plate under its end between it and the top of the pillow-block; or the same adjustment may be made by the use of set-screws or other well-known means.

The upper supporting-wheel is preferably mounted in suitable bearings that may be vertically adjusted to accommodate saws of different lengths.

I claim as my invention—

1. The combination, in a band sawing-machine, with the band-saw and the upper wheel, of the lower wheel mounted in movable boxes and bearing upon the saw with a yielding pressure, whereby said wheel automatically regulates the tension of the saw, as set forth.

2. In a band sawing-machine, and in combination with the saw and upper supporting-wheel, the lower wheel mounted in movable boxes and means for regulating the pressure of said wheel on the saw, as set forth.

3. The combination, in a band sawing-machine, with the lower wheel, its shaft and boxes, of pivoted bars 9, supporting said boxes, a shaft, 19, provided with crank-arms 17, links 15, connected with said crank-arms and with the free ends of said pivoted bars, a transverse bar, 21, secured to the shaft 19, and a sliding weight, 23, on said bar, all substantially as described.

4. The combination, in a band sawing-machine, with the saw and the upper wheel, of the lower wheel, its shaft mounted in yielding bearings, and adjusting means for horizontally and vertically moving the end of the shaft farthest from said lower wheel, as and for the purpose set forth.

5. The combination, in a band sawing-machine, with the supporting-frame and the band-saw, of an upper supporting-wheel mounted in fixed adjustable bearings and a lower driving-wheel mounted in yielding bearings, for the purpose set forth.

6. The combination, in a band sawing-machine, with the saw and the upper wheel, of the lower wheel, a shaft supporting said wheel upon one end and adjustable at its opposite end both horizontally and vertically for the purpose of training the saw, substantially as described.

7. In a band sawing-machine, and in combination with the saw and the upper wheel mounted in fixed bearings, an automatically adjustable lower wheel for regulating the tension of the saw, substantially as described.

In testimony whereof I have hereunto set my hand this 7th day of January, 1886.

CHARLES ESPLIN.

In presence of—
JOSEPH GARBETT,
WARREN H. GETCHELL.